(12) United States Patent
Acharya et al.

(10) Patent No.: US 7,783,704 B2
(45) Date of Patent: *Aug. 24, 2010

(54) SYSTEM AND APPARATUS FOR GEOGRAPHICALLY DISTRIBUTED VOIP CONFERENCE SERVICE WITH ENHANCED QOS

(75) Inventors: Arup Acharya, Nanuet, NY (US); Rong N Chang, Pleasantville, NY (US); Dilip Kandlur, San Jose, CA (US); Zon-Yin Shae, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/017,187

(22) Filed: Jan. 21, 2008

(65) Prior Publication Data

US 2008/0112338 A1    May 15, 2008

Related U.S. Application Data

(63) Continuation of application No. 10/697,834, filed on Oct. 30, 2003, now Pat. No. 7,353,255.

(51) Int. Cl.
*G06F 15/16* (2006.01)
*G06F 15/177* (2006.01)

(52) U.S. Cl. ............... 709/204; 709/205; 709/207; 709/218; 709/222

(58) Field of Classification Search ............ 709/203, 709/204, 205, 217, 220, 227, 228, 248
See application file for complete search history.

(56) References Cited

U.S. PATENT DOCUMENTS

| | | | |
|---|---|---|---|
| 5,991,276 A | 11/1999 | Yamamoto | |
| 6,195,091 B1 | 2/2001 | Harple et al. | |
| 6,349,327 B1 | 2/2002 | Tang et al. | |
| 6,442,590 B1 | 8/2002 | Inala et al. | |
| 6,466,550 B1 | 10/2002 | Foster et al. | |
| 6,484,315 B1 | 11/2002 | Ziese | |
| 6,509,925 B1 | 1/2003 | Dermler et al. | |
| 6,567,813 B1 | 5/2003 | Zhu et al. | |
| 6,584,493 B1 | 6/2003 | Butler | |
| 6,671,262 B1* | 12/2003 | Kung et al. | 709/204 |
| 6,901,448 B2* | 5/2005 | Zhu et al. | 709/228 |
| 2001/0009014 A1 | 7/2001 | Savage et al. | |
| 2002/0184391 A1* | 12/2002 | Phillips | 709/248 |
| 2003/0023672 A1* | 1/2003 | Vaysman | 709/203 |

* cited by examiner

*Primary Examiner*—Quang N. Nguyen
(74) *Attorney, Agent, or Firm*—August Law, LLC; George Willinghan

(57) ABSTRACT

The present invention is directed to a system, including apparatus and architecture, and method for providing scheduled and ad hoc voice over IP conference services having enhanced quality and reliability. The system uses an overlay network of geographically distributed conference servers working simultaneously and collaboratively to host a given conference session. Multiple conference servers simultaneously and collaboratively perform the necessary audio mixing. The voice routing path is established and controlled within the overlay network and supports conference services across different conference service providers.

17 Claims, 7 Drawing Sheets

Distributed VoIP Conferencing

SYSTEM AND APPARATUS FOR GEOGRAPHICALLY DISTRIBUTED VOIP CONFERENCE SERVICE WITH ENHANCED QOS

CROSS-REFERENCE TO RELATED APPLICATIONS

The present application is a continuation of U.S. application Ser. No. 10/697,834, filed Oct. 30, 2003, which issued as U.S. Pat. No. 7,353,255 on Apr. 1, 2008. The entire disclosure of that application is incorporated herein by reference.

FIELD OF THE INVENTION

This present invention is directed to the field voice over internet protocol (VoIP) teleconferencing. In particular, the present invention is directed to VoIP conferencing services over a collaborative distributed server network using Session Initiation Protocol (SIP).

BACKGROUND OF THE INVENTION

Multi-party telephone conferences can be pre-scheduled or ad hoc. Pre-scheduled conferences set the time and duration of the conference in advance. Ad hoc conferences are created spontaneously without a pre-determined start time or duration. In general, pre-scheduled conferencing services, for example traditional conferencing services provided by telephony carriers or the web based voice over internet protocol (VoIP) conferencing services, provide a mechanism for a user to create and to pre-schedule a conference. These mechanisms include either using the telephone or a unique web page. After the conference is scheduled, each party wishing to participate in the conference is provided either a telephone number to call with conference identification code and password or a special web page for internet participants to join the conference. These pre-scheduled types of conferences utilize a centralized computer that can act as both a conference server and an audio mixer to host the conference. Pre-scheduled, multi-party conferences are the standard type of conferences provided by the telephone companies.

In ad hoc conferencing, a central conference server and audio mixer is also needed to host the conference. Ad hoc conferences are typically internet based, and computer applications have been created to facilitate this type of conferencing. Therefore, ad hoc conferences require interaction between these enterprise computer applications and voice communication.

Unfortunately, centralized conferencing systems suffer from long delays and bandwidth congestion, resulting in higher packet loss and decreased quality of service. In addition, the voice packets in conventional conferencing systems travel through internet protocol (IP) routers with no provisions for increased quality of service at the conference session level for voice quality that users will experience, even with some IP routers implementing some simple quality of service improvements by taking advantage of the knowledge in the link level.

Application integrated ad hoc types of conferences have specific technical issues that contribute to longer delays. A VoIP conference enabled application can be deployed over a geographically wide spread area. Users are provided with a "Click To Join" button to create a new conference or to join an existing conference. For example, the ad hoc conference can be created during an instant messaging chat and initiated from the instant messaging application. One of the participants in the messaging chat selects the "Click To Join" button, creating a conference at a first conference server. Eventually, a total of ten participants join the conference. One participant is located in Asia, and the other nine participants are located in the continental United States. Since the participant that first selected the "Click To Join" button is located in Asia, the host conference server is also in Asia. The other nine conference participants are forced to use the conference server located in Asia. These nine participants will then have to deal with quality of service issues associated with trans-Pacific transmission, for example signal delay.

In addition to the technical limitations associated with the significant distance between most of the conference participants and the host server, each participant may be configured to use different conference service providers. Since the conference identification created in the ad hoc conference for a VoIP application is a unique random number and not a public telephone number, the conference identification number is only known and routable within its own service provider domain. Therefore, participants not within this domain may not be able to join the conference.

U.S. Pat. No. 6,567,813 (the '813 patent) discloses a conference system that allows multiple participants to join the conference from multiple conference servers. However, a single, centralized conference server is still used to provide audio mixing for the conference. In addition, centralized conference identification management is used, requiring every participant to join the conference by visiting a single web page. Participants cannot launch or join a conference directly from an application without visiting the special conference service provider web page. The servers used for the conference are assigned when the participant visits the special conference service provider web page, allowing the centralized conference manager to control and monitor which conference servers are used for the conference. Only single conference service provider models are supported. The conference system disclosed in the '813 patent does not work across multiple conference service providers.

The need still exists for a multi-party conference system that provides for improved quality of service using a distributed network of collaborative servers. The system will eliminate the need for a single, centralized server to provide conference hosting and audio mixing. Instead, these services would be distributed among multiple collaborative servers that are disposed as close to each one of the participants as possible. The distributive server system would handle both pre-scheduled and ad hoc conferences.

SUMMARY OF THE INVENTION

The present invention provides a conferencing system that constitutes a set of distributed conference servers and audio mixers to form an overlay network to provide a controllable quality of service. A set of geographically distributed conference servers form an overlay network and host collaboratively to provide route control for improved quality of service (QoS), load balancing, and disaster recovery for a given conference session. Every directly attached conference server performs the audio mixing function simultaneously and collaboratively for the given conference session.

The system of the present invention uses any number of conferencing servers in the overlay network to collaboratively host a given conference session. These servers include servers directly attached to the conference participants and additional servers that are not directly attached. As used herein, the term "directly attached" may be defined as those servers in a network that are the first servers, computers or hubs to which the participant communicates when sending or receiving data or voice communications across the network. The term "directly attached" is not limited to servers in physical contact with the equipment disposed at the participant's premises or to servers within a particular geographic or spatial region.

In one embodiment, at least all the directly attached conference servers are included in the overlay network, and at least these conference servers perform the audio mixing function for a conference session. The additional conference servers in the conference voice routing path can also provide audio mixing but preferably provide a transparent route-through function without audio mixing. The conference voice routing path is optimally chosen based on some optimization algorithm in the overlay network. Suitable algorithms include conventional algorithms available and known to one of skill in the art.

The present invention also provides a method for conducting a pre-scheduled conference having a conference telephone number. This method includes a distributed and scalable mechanism for the overlay network to create a set of collaborative conference servers that can be used to host the conference. According to this mechanism, the conference server associated with the conference telephone assigns a set of conference servers, one for each participant, as the directly attached conference servers in the overlay network to host collaboratively a conference session.

The present invention also provides a method for creating ad hoc conferences, for example from computer based applications such as instant messaging. This method uses a distributed and scalable mechanism to create a set of conference servers to host the conference. According to this mechanism, each conference participant obtains internet protocol (IP) address and connection delay time information directly from all of the other conference participants and communicates this information to its directly attached conference server. This establishes the overlay network and allows all the conference servers to communicate with each other. The present invention can also be used to support peer-to-peer two-party only voice over IP (VoIP) calls for better quality of service The present invention also provides a controllable voice data path through the overlay network such that data and voice packets are not sent directly from a participant but are sent to the directly attached conference server, regardless of the destination address in the original request. In addition, the number and arrangement of the conference server nodes in the voice routing path can be changed dynamically based on the current communication link status (e.g., congestion) during the course of the conference for better QoS, improved performance, lower cost and increased reliability. Dynamic changes to the server nodes are achieved by the combination of the three basic route modification operations, add a server, remove a server and transfer between servers, applied on across the distributed conference server nodes that constitutes the voice routing path.

DETAILED DESCRIPTION

Figure 1:
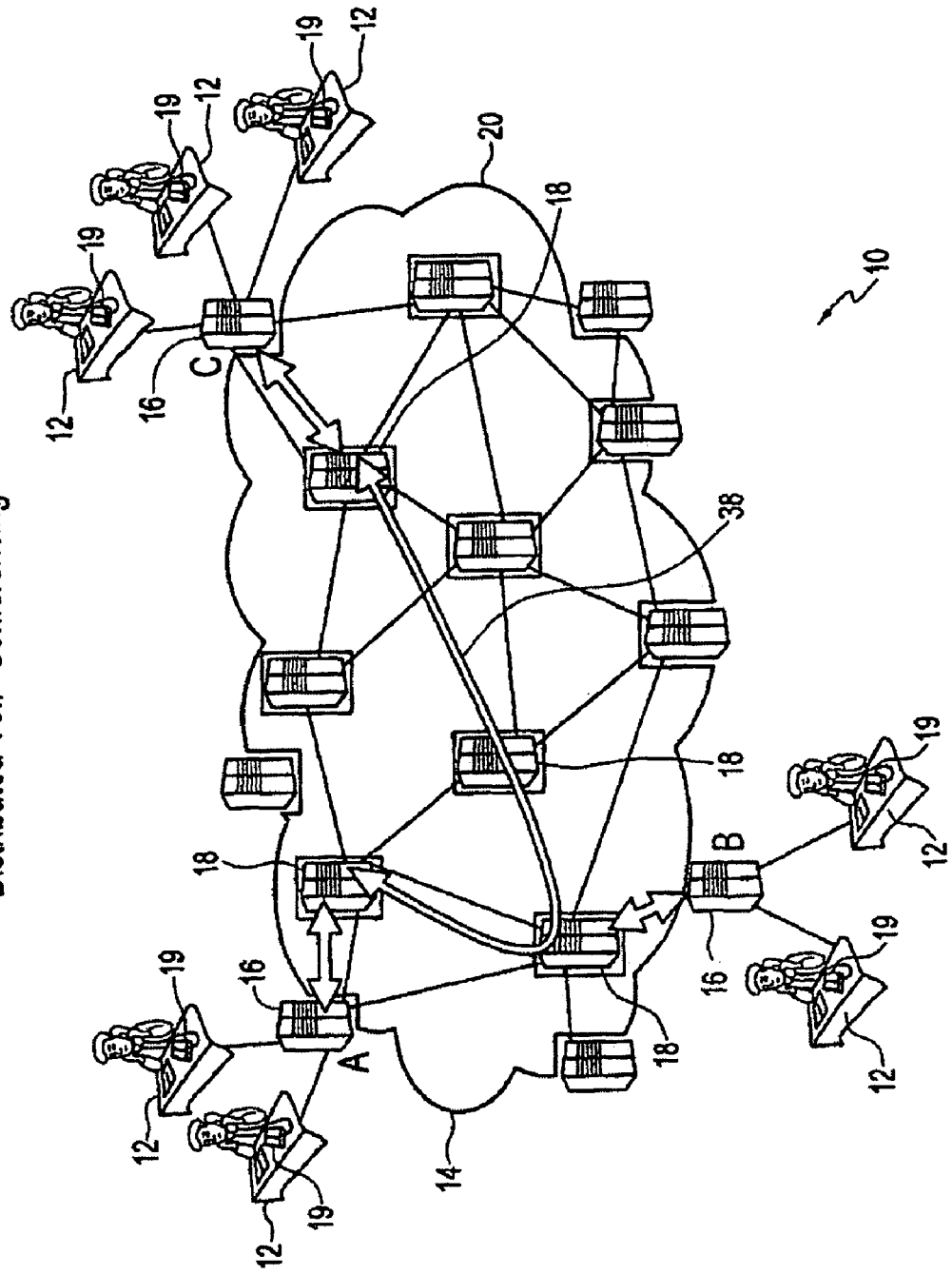
FIG. 1 is a schematic representation of an embodiment of a distributed conferencing system in accordance with the present invention.

Referring initially to FIG. 1, a multi-participant conferencing system 10 in accordance with the present invention is illustrated for providing data and voice conferencing capabilities to a plurality of participants 12. The conferencing system 10 uses a plurality of conference servers and audio mixers to define an overlay network and to perform the audio mixing function simultaneously during a single conference session. The overlay network can be owned and managed by a single service provider or can be owned and managed by multiple, independent service providers.

As illustrated, the conferencing system 10 includes an overlay network 14 containing a plurality of collaborative conference servers. In one embodiment, the collaborative conference servers include conference servers directly attached to one or more conference participants 16. In another embodiment, the collaborative conference servers also include a plurality of additional servers 18 in communication with the directly attached conference servers 16. The directly attached and additional servers 16, 18 can be spatially or geographically distributed as needed by the relative location of the conference participants. Suitable spatial or geographic distributions include, but are not limited to, across a single office location, across a city or town, across a continent and global. Each one of the participants 12 connects to a directly attached conference server 16 using customer premises equipment 19 including wireless, wired and internet protocol (IP) telephones and personal computers.

As stated previously, the term "directly attached" may be defined as those servers in a network that are the first servers, computers or hubs to which the participant communicates when sending or receiving data or voice communications across the network. The term "directly attached" is not limited to servers in physical contact with the equipment disposed at the participant's premises or to servers within a particular geographic or spatial region. The additional servers 18 can be directly attached servers or servers that are not directly attached to the conference participants 12. Although the additional servers 18 can provide audio mixing, preferably the additional servers 18 provide a transparent route-through function without audio mixing.

Suitable conference servers include any computer, processor or computer server that can perform the necessary conference hosting and audio mixing functions for the multi-participant conferencing system 10. Both the directly attached and additional conference servers 16, 18 can be part of a computer network 20 such as a local area network (LAN), wide area network (WAN), for example the internet or World Wide Web, private area networks, secure networks and telephone networks. In one embodiment, all of the servers can be disposed within the same network domain or under the control of a single service provider. Alternatively, at least two conference servers can be disposed in two different domains or can be under the control of two different service providers.

All of the conference servers 16, 18 are in communication with each other using a protocol suitable to perform the necessary conferencing functions. In one embodiment, the protocol is the H323 protocol. Preferably, the protocol is Session Initiation Protocol (SIP).

Each directly attached conference server 16 can be in direct communication with one or more participants and provides the audio mixing function for its directly attached participants. In addition, all of the directly attached conference servers 16 can provide the audio mixing functions for their directly attached participants 12 simultaneously. Therefore, a traditional centralized conference architecture where only a single conference server is used for audio mixing for a conference session is avoided, and the associated transport delays are eliminated.

Figure 2:
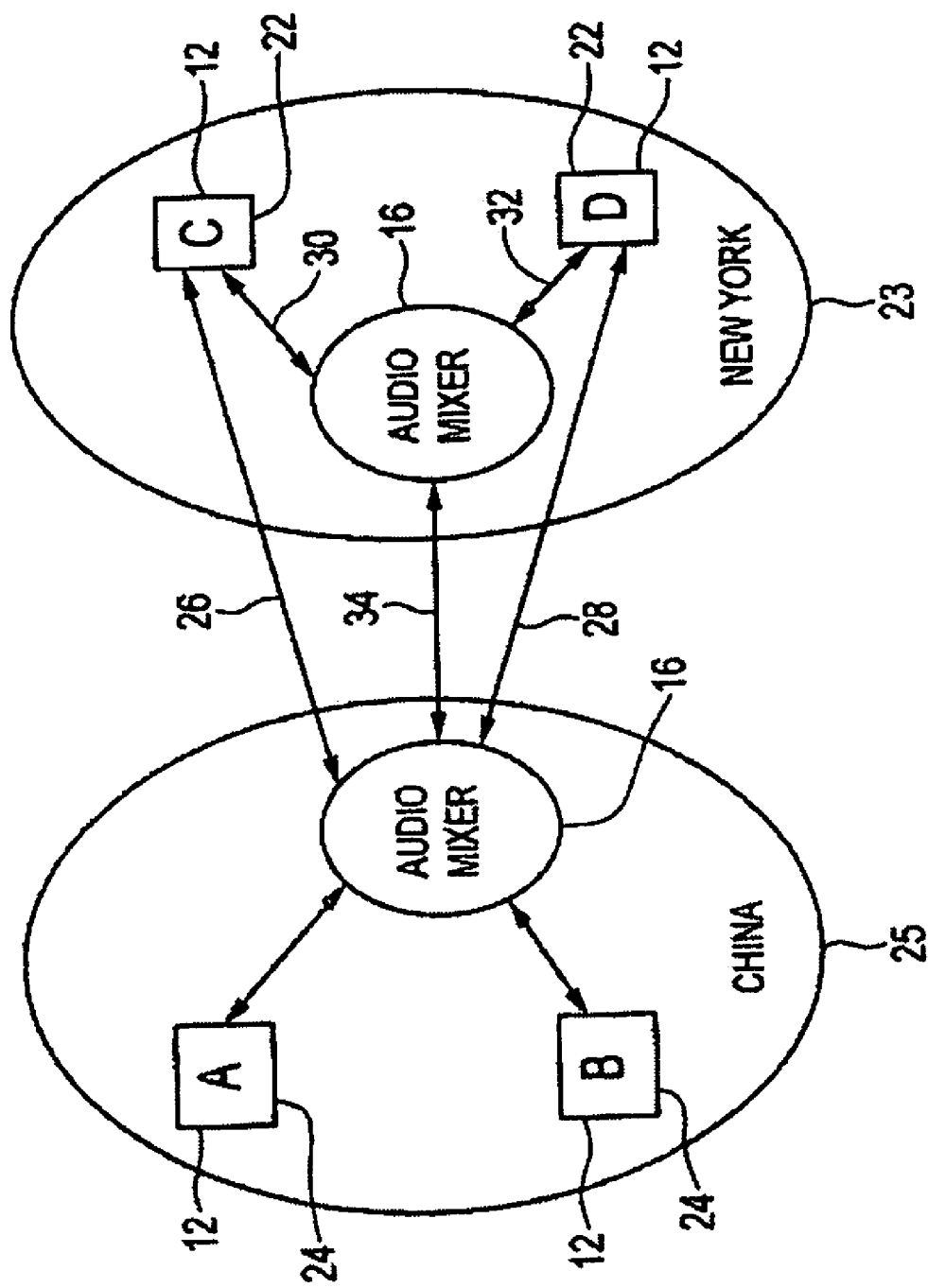
FIG. 2 is a schematic representation illustrating roundtrip delays in both centralized and distributed conference architecture.

Round trip signal delays are particularly problematic for international or inter-continental conferences. As is shown in FIG. 2, the conferencing system 10 reduces the roundtrip signal delay time associated with centralized conference systems by using the distributed conferencing architecture of the present invention.

As shown, a first group of conference participants 22 located, for example, in New York 23 and a second group of conference participants 24 located in China 25 attend the conference by directly attaching to the current closest local conference server 16. Audio mixing for each participant 12 is performed at the directly attached conference server 16 that is disposed in relative geographic proximity to each participant 12. Since each participant is directly connected to a geographically close local server that provides for audio mixing, the roundtrip distance between the first party participants 22 and the second party participants 24 is minimized, and each participant 12 experiences a low delay conference performance.

The reduction in roundtrip delay is most apparent when communicating between two first party participants 22. For a centralized conference originating in China 25, the roundtrip path between first party participants 22 equals the sum of a first path to the central server 26 and a second path from the central server 28. For the conferencing system 10 of the present invention, the first party participants 22 communicate across a roundtrip path that equals a first direct server path 30 and a second direct server path 32. For international conferences, the lengths of the first and second direct server paths 30, 32 are practically negligible compared to the first and second central server paths 26, 28. The longest path for international conferences using the conference system 10 of the present invention is between a first party participant 22 and a second party participant 24. The length of this path equals the first direct server path 30, the length of the overlay network 34 between the directly connected conference servers 16 and a third direct server path 36. This distance, however, is still less than the centralized roundtrip distance between two first party participants 22 because the lengths of the first and third direct server paths 30, 36 are practically negligible compared to the first and second central server paths 26, 28.

As shown in FIG. 1, the overlay network 14 establishes an overlay network path 38 among all of the conference servers that is defined and controllable. In order to establish the overlay network path 38, the provider of the conference system searches for an optimal conference data and voice path 38 that connects to every attached conference server 16, 18. In one embodiment, the optimal conference data and voice path connects to every attached conference server 16, 18 once and only once. This provides a path 38 that is the lowest cost for any given combination of links and computing resources. In addition, the established overlay network path 38 does not have any closed loops.

Figure 3:
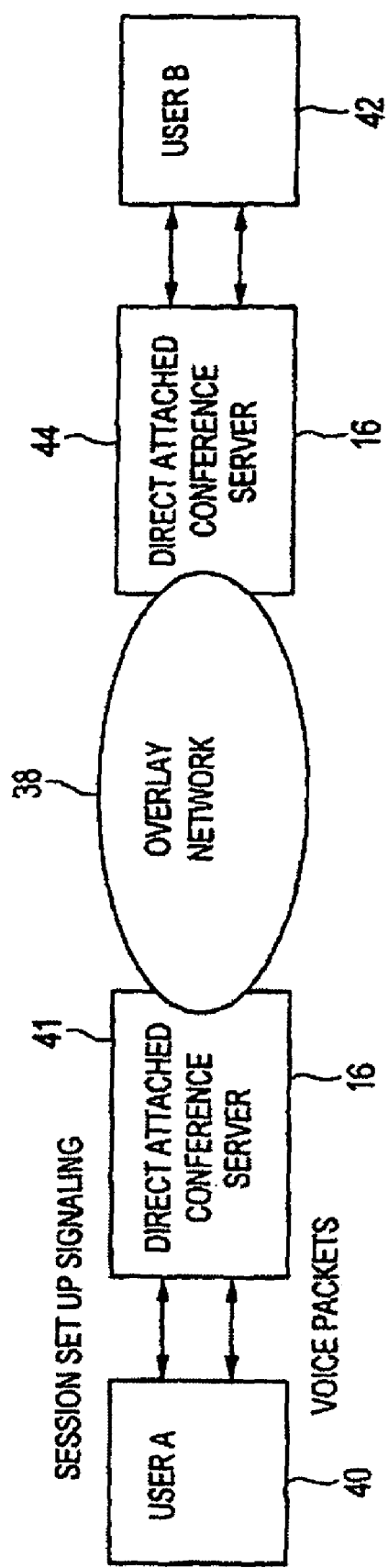
FIG. 3 is a schematic representation illustrating the routing of voice data packets through an overlay network.

As shown in FIG. 3, the conference system 10 includes a mechanism to route data and voice packets through the overlay network path 38 from a source participant 40 to a destination participant 42. For the source participant 40, the directly attached conference server 41 will report, regardless of the voice over internet protocol (VoIP) packets destination address shown in the signaling message, for example SIP "INVITE", its own media internet protocol (IP) and port number. For SIP, this information is communicated in the signal description protocol (SDP) body of the SIP response. Therefore, the voice data are not sent to the destination server 44 in an uncontrollable IP routing path. Instead, the voice data are directed into the overlay network 38 for improved and controllable quality of service (QoS). Once voice data enter the overlay network 38, an optimized route through the overlay network 38 to the destination server 44 can be calculated using any one of a number of optimization algorithms that are readily available and known in the art. Although illustrated for multi-participant conferences, controllable paths through overlay networks can also be applied to peer-to-peer two-party VoIP calls to achieve better quality of service. For an SIP embodiment, each SIP client sends the SIP "INVITE" request to its direct attached conference server 16 with the destination party SIP universal resource locator (URL) in the request message. The same function can also be implemented if each SIP client pre-configures its outbound proxy as one of the conference servers.

Figure 4:
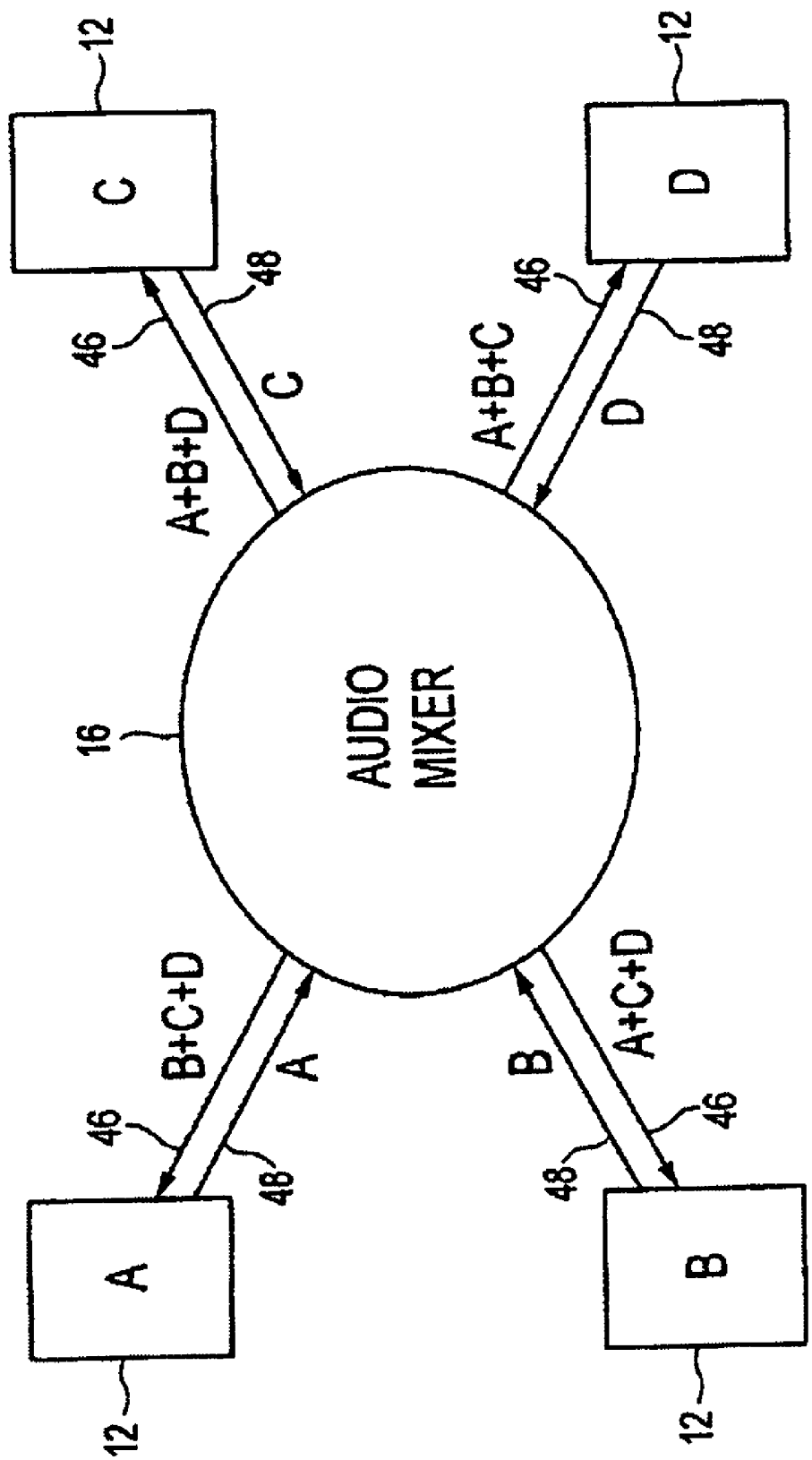
FIG. 4 is a schematic representation of an audio mixing rule used by the conference servers.

As shown in FIG. 4, audio mixing at each directly attached server 16 can be performed according to a mixing rule that makes it possible for every participant 12 to hear other participants 12 that are also directly attached to the same local conference server 16 with a low delay. This mixing rule sets the output signal 46 to each participant 12 equal to the sum of all of the other input signals 48 to the conference server 16 except its own input signal 48. Therefore, each participant 12 will not receive its own input signal 48 from the server 16 or listen to its own input.

A method for establishing a multi-participant conference over an overlay network 14 of distributed, collaborative conference servers 16, 18 in accordance with the present invention includes establishing the plurality of geographically distributed, collaborative conference servers 16, 18, connecting at least two of the conference servers 16 directly to at least two separate conference participants 12, and using each one of the directly connected conference servers 16 to simultaneously provide audio mixing for its directly attached participant 12. Preferably, the conference servers 16, 18 are established as SIP servers. The two directly connected conference servers can be managed by the same service provider or by separate and independent service providers.

Having identified the conference servers 16, 18, a controllable voice packet routing path 38 through the overlay network 14 is defined and the data and voice packets are controlled through this routing path 38. In one embodiment, the routing path is established by connecting once and only once to every conference server 16 that is directly attached to a participant 12. Once established, all voice data packets are directed through the overlay network 14 along the routing path 38 and are not simply randomly send across the network. In addition, for a given directly attached conference server 16, the output to each participant 12 connected to that server 16 is set equal to the sum of all inputs to that connected conference server except an input associated with that connected participant 12.

Figure 5:
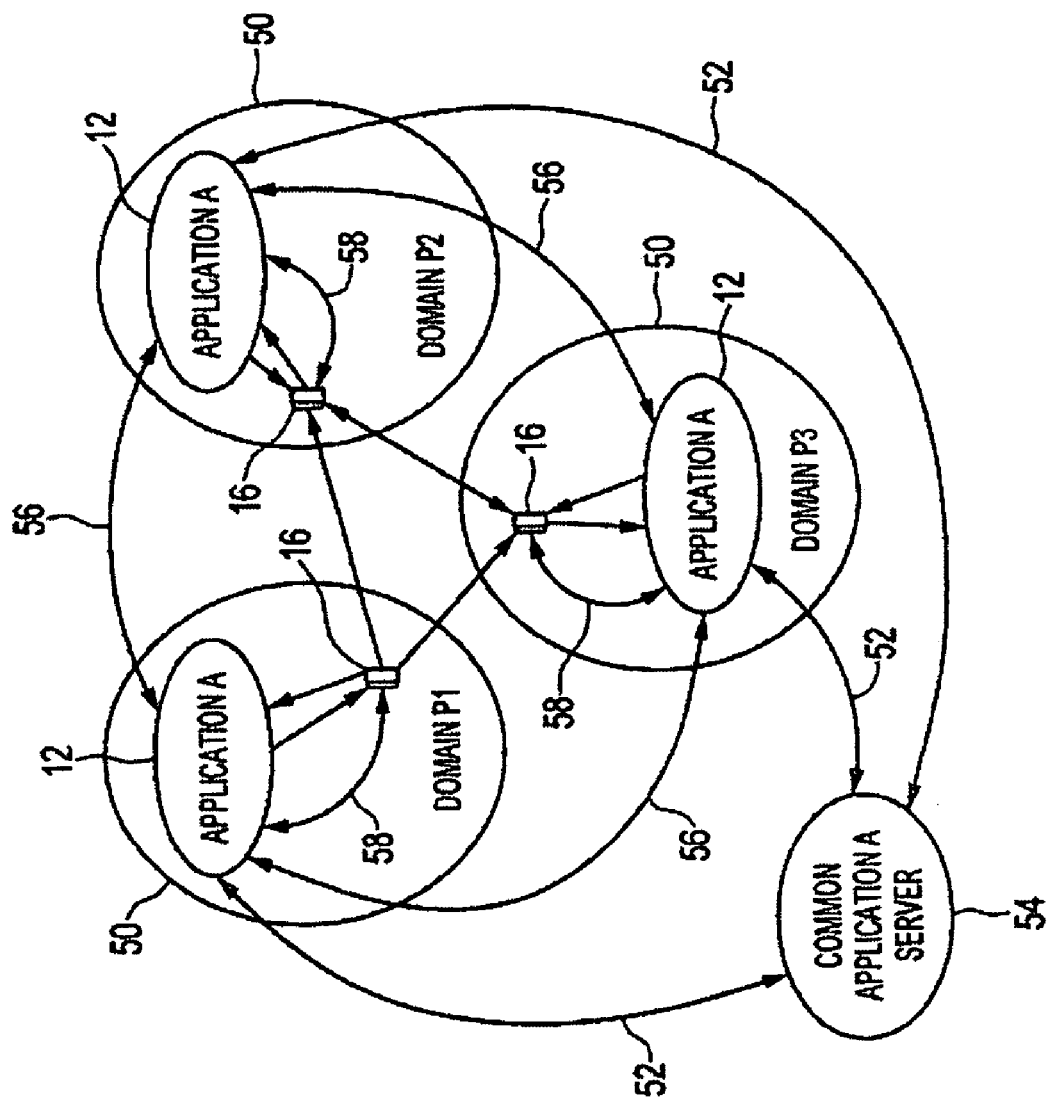
FIG. 5 is a schematic representation of an embodiment of the ad hoc creation of an overlay network of conference servers in accordance with the present invention.

The method of the present invention can be used to establish both ad hoc and pre-scheduled multi-participant conferences. Referring to FIG. 5, in order to establish a plurality of conference servers for an ad hoc conference, an available set of conference servers 16, 18 is identified. In one embodiment, each geographically spread and deployed application can be pre-configured with a set of URLs to identify the available conference servers. The conference identification (ID) dynamically created by a given application can be random. These conference servers can be located in a single domain or can be distributed across a plurality of different domains 50 under the separate control of different service providers. Each participant 12 is running a suitable application, for example an instant messaging application, and elects to initiate or join a multi-participant conference, for example a voice conference. In one embodiment, this is accomplished by selecting a feature within the running application to initiate the multi-party voice conference. Selection can be accomplished by methods known in the art including "pointing and clicking" from a computer application screen.

Once a multi-participant voice conference is selected, each participant 12 connects directly 52 to an application specific server 54, and the application specific server 54 identifies all of the participants 12. Each application has its own mechanism to identify and communicate all of the application participants 12 to each other. Suitable mechanisms are application specific and generally known in the art. The result of these steps is to let every participant 12 in the collaborative application know the identity of all the other collaborating participants 12.

Each participant 12 then connects directly to a geographically close conference server 16 and communicates 56 an IP address and a path delay time for this conference server directly to all of the other connected conference participants 12. In one embodiment using SIP, the SIP application client of every conference participant 12 "SUBSCRIBEs" to all the other conference participants 12 and asks each one of these other participants 12 to "NOTIFY" its directly attached conference server's IP address and path delay time or equivalence. The path delay time information can be included in the overall end-to-end voice QoS calculation.

Once each one of the participants 12 has the addresses and delay times for the directly attached conference servers 16 of all the other participants 12, each participant 12 communicates this address and delay time information directly to its connected conference server 58. In an embodiment using SIP, each conference server 16 "SUBSCRIBEs" to its directly attached conference participant 12 to ask each participant to "NOTIFY" the IP addresses and the path delay time (or equivalence) of all collaborative conference servers 16. If the application is deployed at different service providers, each service provider can provide a public available SIP URL for the above "SUBSCRIBE" and "NOTIFY" operations when across the service provider boundaries. Therefore, every conference server 16 knows the collaborative conference servers 16 for the particular conference session, and a distributed ad hoc conference session can be established.

Figure 6:
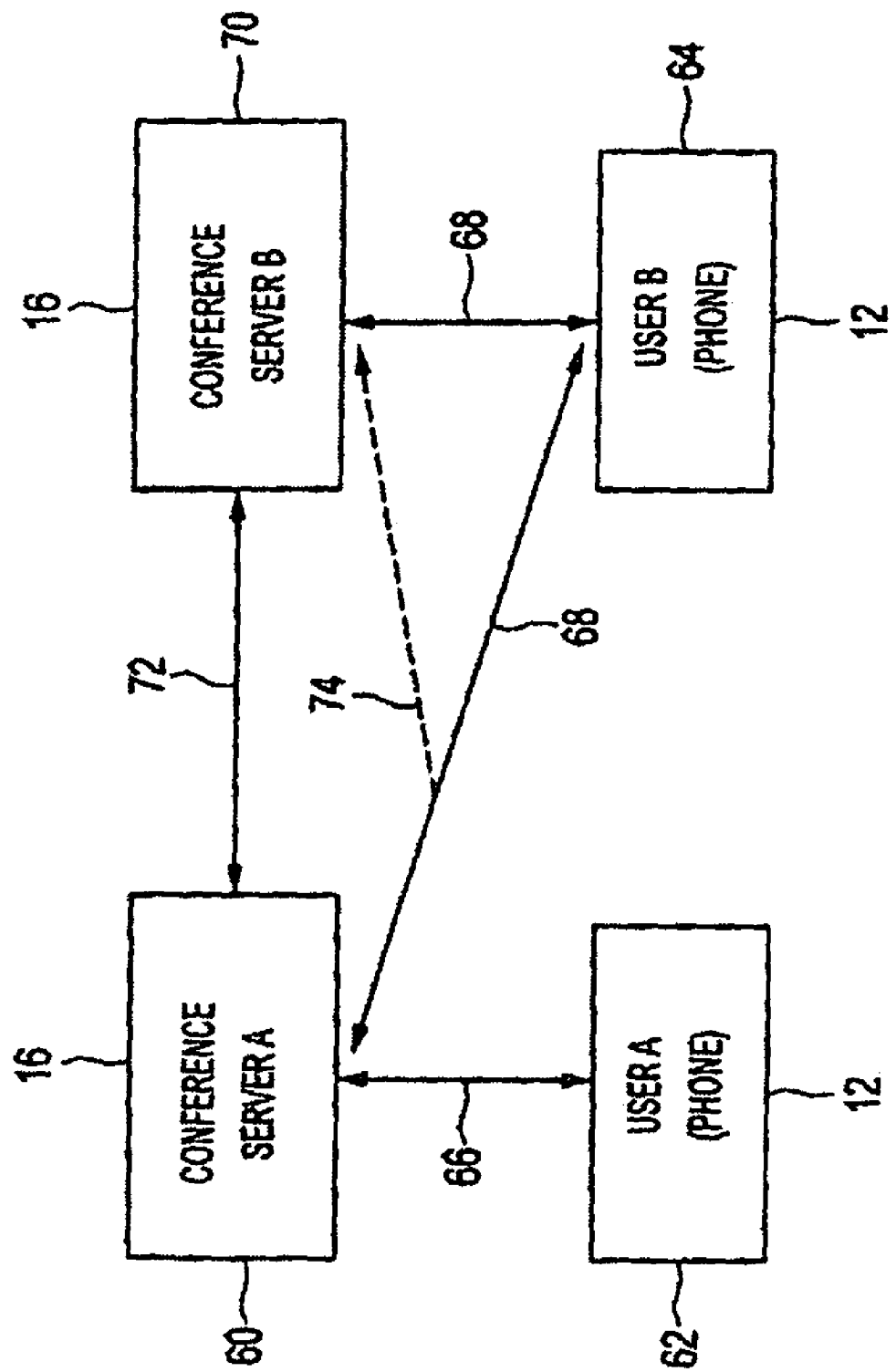
FIG. 6 is schematic representation of an embodiment of a collaborative conference server discovery mechanism for use with pre-scheduled conferences.

The method of the present invention can also be used to establish a collaborative overlay network 14 and to communicate the information for all the other collaborative conference servers 16, 18 for a pre-scheduled conference. As shown in FIG. 6, each participant 12 is provided a conference telephone number for the multi-participant conference. The conference telephone number is associated with a first conference server 60. All of the conference participants 12, for example a first conference participant 62 and a second conference participant 64 join the conference by dialing the conference telephone number to establish direct connections 66, 68 with the first conference server 60.

Unlike ad-hoc conferences that use applications such as instant messaging applications, the conference participants 12 do not have an established channel for communication among the participants 12 to obtain the necessary information about all of the collaborative, directly attached conference servers 16. Therefore, the first conference server 60 is used to identify a second conference server 70 and all subsequent conference servers 16. The first conference server 60 locates suitable servers from a list of available servers maintained, for example, in a database or by a service provider. The first conference server 60 uses cost and performance optimization to locate a suitable second conference server 70.

Once the second conference server 70 is identified, the first conference server 60 communicates 72 with the second conference server 70 in order to establish the collaborative association for jointly hosting the conference. The first conference server 60 then transfers 74 the second participant connection 68 to the second conference server 70, for example, by sending the SIP command "REFER" to the second participant 64. As a result, the first conference server 60 is the direct attached server for the first participant 62, and the second conference server 70 is the direct attached server for the second participant 64. In general, the first conference server 60 creates and assigns the collaborative conference servers 16 for all conference participants 12.

The present invention is also directed to a system and method to dynamically modify the voice routing path 38 during a conference for either better quality or efficient use of resource without causing any disruption in the conference. Therefore, none of the conference participants 12 are aware of any conference disruption but may notice improvement in the QoS resulting from these voice routing path modifications. Voice routing path modifications include transferring one or more participants 12 from a first conference server 16 to a second conference server 16, adding one or more conference servers 16 to the overlay network 14 and removing one or more existing conference servers 16 from the overlay network 14.

Figure 7:
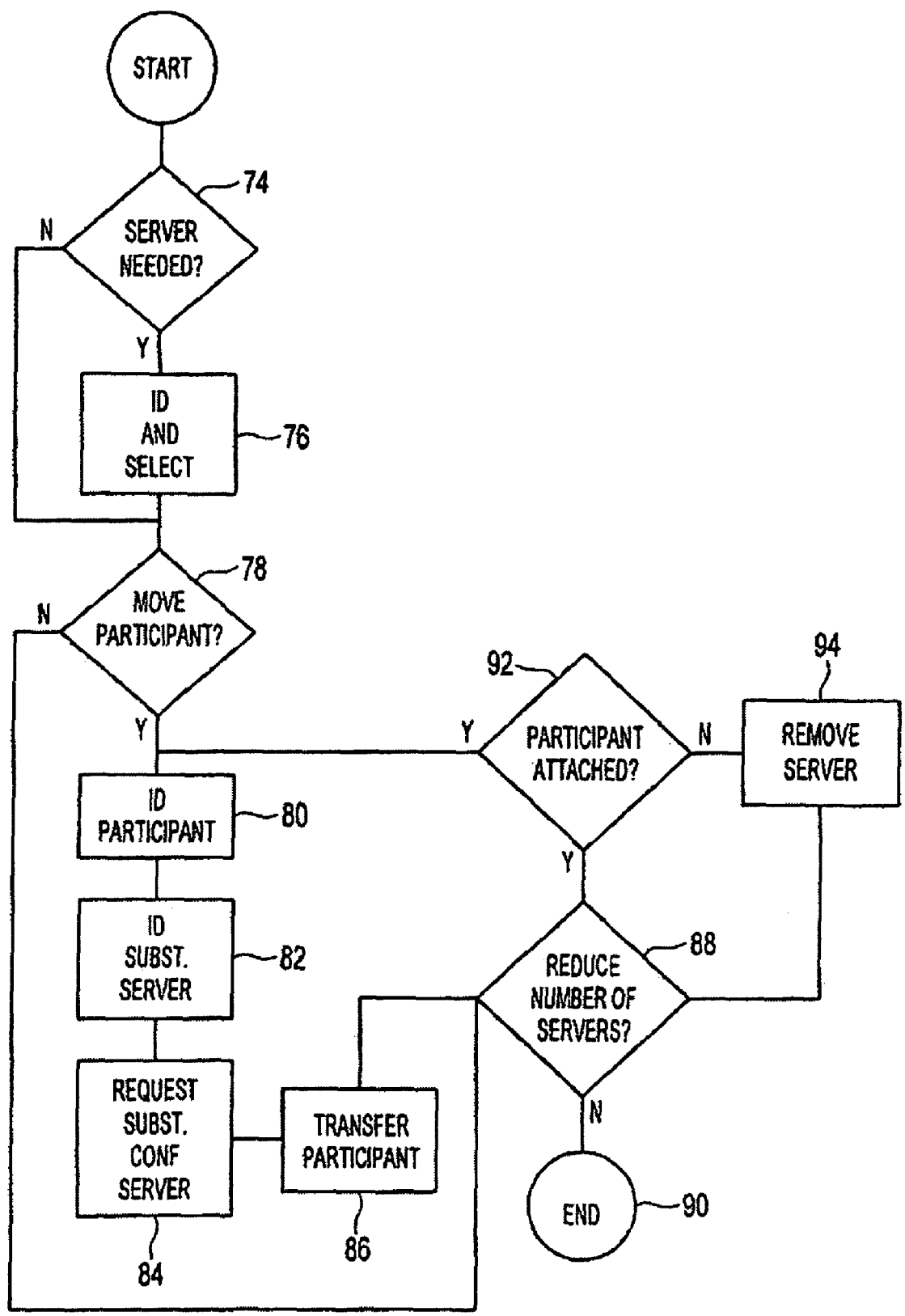
FIG. 7 is flow chart illustrating an embodiment of a method to dynamically modify the conference server node configuration in accordance with the present invention.

Referring to FIG. 7, in order to dynamically modify a given conference, the system first checks to see if another conference server needs to be added 74. A new server could be needed due to the failure of an existing server, for improved QoS or because of the addition of a new participant. The addition of a new participant does not necessarily require the addition of a new server, because the new participant can be attached to an established server in the overlay network. If a new server is not needed, then the system does not add another server. If a new server is needed, then a new conference server is identified and selected 76. In one embodiment, an existing or original conference server is identified to function as a client to request the new conference server and to establish a new conference with the original conference server with the same conference ID.

Next, the system checks to see if any participants need to be moved from one conference server to another conference server including the new conference server 78. Participants could need to be moved to connect with a new server, to move to another server to improve QoS or to move from a malfunctioning conference server. If no moves are needed, then no participants are moved. If conference participants are identified that need to be moved from a first conference server to a second conference server, all of the participants are identified 80, and a suitable substitute conference server is identified and selected for each participant to be moved 82. The current conference server for each participant to be moved functions as a conference participant and requests the selected substitute conference server to establish a new conference using the same conference ID for the original conference server 84. The original conference server then transfers, for example by using "RE-INVITE" in SIP, at least one conference participant attached to the original conference server to the substitute conference server 86. The same transfer process is used for all of the participants that are going to be transferred to a substitute conference server.

Once all of the identified participants have been moved, then the system checks to see if the number of conference servers needs to be reduced 88. The number of conference servers could need to be reduced because of participants leaving the conference or because of participant transfers among conference servers. For example, if all of the participants have been removed from an original conference server, then the original conference server would need to be disconnected from the system. If no servers need to be removed, then the system ends 90. If a server needs to be removed, then the system checks to see if any participants are directly attached 92 to the server. If not, then the server is removed 94 and the system returns to see if any additional servers need to be removed. If participants are directly attached and need to be moved, then the system identifies this participant 80 and proceeds to transfer this participant to a substitute server as before. This process will be repeated until all of the participants are transferred from the server to be removed and then the server will be removed 94.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for establishing an overlay network of collaborative conference servers for use in a multi-participant conference, the method comprising:
   using a service provider to identify a set of conference servers that constitute the overlay network;
   using the identified conference servers to communicate an internet protocol address and a path delay time for each one of the identified conference servers to all of the identified conference servers in the set of conference servers to establish a plurality of collaborative conference servers by:
      communicating a path delay time for each one of the conference servers among the connected conference participants; and
      communicating the delay times of conference servers from each participant to its directly connected conference server;
   connecting at least two of the collaborative conference servers directly to at least two separate conference participants;
   establishing a controllable voice packet routing path through the collaborative conference servers in the overlay network, the controllable voice packet routing path comprising a path that connects once and only once to each directly attached conference server;
   directing all voice data packets along the established voice packet routing path through the overlay network; and
   using each one of the directly connected collaborative conference servers to simultaneously provide audio mixing for its directly attached participant.

2. The method of claim 1, further comprising managing at least two of the collaborative conference servers using at least two separate service providers.

3. The method of claim 1, further comprising dynamically modifying the voice routing path during the multi-participant conference including transferring one or more participants from a first conference server to a second conference server, adding one or more conference servers to the overlay network and removing one or more existing conference servers from the overlay network.

4. The method of claim 1, further comprising setting the output from one of the connected conference servers to the connected participant equal to the sum of all inputs to that connected conference server except an input associated with that connected participant.

5. The method of claim 1, wherein the step of communicating the internet protocol addresses and path delay times further comprises:
   communicating an internet protocol address for each one of the conference servers among the connected conference participants; and
   communicating the addresses of conference servers from each participant to its directly connected conference server.

6. The method of claim 1, wherein the step of connecting at least two of the conference servers directly to at least two separate conference participants further comprises:
   associating a first conference server with a contact number associated with the multi-participant conference;
   connecting a first and second conference participant to the first conference server using the contact number;
   using the first conference server to identify a second conference server; and transferring the second conference participant to the second conference server.

7. The method of claim 1, wherein the step of directing all voice data packets along the established voice packet routing path through the overlay network further comprises communicating media internet protocols and port numbers of the directly attached conference servers regardless of destination addresses shown in signaling messages associated with the voice data packets.

8. A computer readable storage medium containing a computer executable code that when read by a computer causes the computer to perform method for establishing an overlay network of collaborative conference servers for use in a multi-participant conference, the method comprising:
   using a service provider to identify a set of conference servers that constitute the overlay network;
   using the identified conference servers to communicate an interne protocol address and a path delay time for each one of the identified conference servers to all of the identified conference servers in the set of conference servers to establish a plurality of collaborative conference servers by:
      communicating a path delay time for each one of the conference servers among the connected conference participants; and
      communicating the delay times of conference servers from each participant to its directly connected conference server;
   connecting at least two of the collaborative conference servers directly to at least two separate conference participants;

establishing a controllable voice packet routing path through the collaborative conference servers in the overlay network, the controllable voice packet routing path comprising a path that connects once and only once to each directly attached conference server;

directing all voice data packets along the established voice packet routing path through the overlay network; and using each one of the directly connected collaborative conference servers to simultaneously provide audio mixing for its directly attached participant.

9. The computer readable storage medium of claim 8, wherein the method further comprises managing at least two of the collaborative conference servers using at least two separate service providers.

10. The computer readable storage medium of claim 8, wherein the method further comprises dynamically modifying the voice routing path during the multi-participant conference including transferring one or more participants from a first conference server to a second conference server, adding one or more conference servers to the overlay network and removing one or more existing conference servers from the overlay network.

11. The computer readable storage medium of claim 8, wherein the method further comprises setting the output from one of the connected conference servers to the connected participant equal to the sum of all inputs to that connected conference server except an input associated with that connected participant.

12. The computer readable storage medium of claim 8, wherein the step of communicating the internet protocol addresses and path delay times further comprises:

communicating an internet protocol address for each one of the conference servers among the connected conference participants; and communicating the addresses of conference servers from each participant to its directly connected conference server.

13. The computer readable storage medium of claim 8, wherein the step of connecting at least two of the conference servers directly to at least two separate conference participants further comprises:

associating a first conference server with a contact number associated with the multi-participant conference;

connecting a first and second conference participant to the first conference server using the contact number;

using the first conference server to identify a second conference server; and transferring the second conference participant to the second conference server.

14. The computer readable storage medium of claim 8, wherein the step of establishing a plurality of collaborative conference servers further comprises establishing a plurality of collaborative session initiation protocol conference servers.

15. The computer readable storage medium of claim 8, wherein the step of directing all voice data packets along the established voice packet routing path through the overlay network in the method further comprises communicating media internet protocols and port numbers of the directly attached conference servers regardless of destination addresses shown in signaling messages associated with the voice data packets.

16. A system for providing multi-participant conferencing, the system comprising an overlay network of conference servers arranged to collaboratively host the multi-party conference, the overlay network comprising a plurality of conference servers and a controllable voice packet routing path through the plurality of conference servers in the overlay network, the voice packet routing path comprising a path that connects once and only once to each conference server, each conference server comprising an internet protocol address and a path delay time for all of the other conference servers, directly attached to at least one conference participant and arranged to supply audio mixing for the directly attached participant, wherein all of the conference servers are configured to provide audio mixing for directly attached participants simultaneously and to communicate a path delay time for each one of the conference servers among conference participants, each conference participant is configured to communicate the delay times of conference servers to its directly connected conference server and all voice data packets for the multi-party conference are disposed with the voice routing path through the overlay network.

17. The system of claim 16, wherein the directly attached conference servers are configured to route all voice data packets for the multi-party conference through the overlay network by communicating media internet protocols and port numbers of the directly attached conference servers regardless of destination addresses shown in signaling messages associated with the voice data packets.

* * * * *